(12) United States Patent
Edwards (10) Patent No.: US 7,280,935 B2
(45) Date of Patent: Oct. 9, 2007

(54) DUAL SENSOR ASSEMBLIES FOR POSITIONAL OUTPUT FEEDBACK

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 320 days.

(21) Appl. No.: 10/933,992

(22) Filed: Sep. 2, 2004

(65) Prior Publication Data

US 2006/0047470 A1 Mar. 2, 2006

(51) Int. Cl.
*G01C 9/00* (2006.01)
*G01C 17/00* (2006.01)
*G01C 19/00* (2006.01)

(52) U.S. Cl. ............... 702/150; 360/73.03; 360/97.02; 360/69; 360/71; 360/75

(58) Field of Classification Search ............... 702/150; 360/73.03
See application file for complete search history.

(56) References Cited

U.S. PATENT DOCUMENTS 6,067,203 A * 5/2000 Ottesen et al. ........... 360/73.03
6,352,399 B1 * 3/2002 Martin et al. ............... 414/156

* cited by examiner

*Primary Examiner*—John Barlow
*Assistant Examiner*—Sujoy Kundu
(74) *Attorney, Agent, or Firm*—Eric D. Levinson (57) ABSTRACT

A system for precisely determining a position with resolution on the order of nanometers or sub-nanometers is described. In particular, a system is described that utilizes a first and a second sensor assembly to determine a position of a movable element over a distance many times the capable range of operation of either of the individual sensor assemblies. The two sensor assemblies leap-frog one another in an incremental fashion to ensure that at least one of the sensor assemblies is always within it operational range. Positional signals generated by one of the sensor assemblies can be used to calibrate the other sensor assembly, following an adjustment of the other sensor assembly. The described invention may be implemented in an optical storage disk mastering system to determine the position of mastering optics as the mastering optics translate over the surface of a storage master disk.

12 Claims, 4 Drawing Sheets

DUAL SENSOR ASSEMBLIES FOR POSITIONAL OUTPUT FEEDBACK

TECHNICAL FIELD

The invention relates to positional sensors and, more particularly, to positional sensors having high resolution but limited range.

BACKGROUND

Positional sensors with resolution on the order of a few nanometers or sub-nanometers are used in a wide variety of industrial processes, including fabrication of optical disk products, pattern lithography, and a wide variety of other systems. In some applications, however, metrology requirements for nanometer precision position control must be met over large distances, i.e., distances greater than a millimeter. Many products are subject to metrology limitations for standards, measurements, and fabrication position control on a nanometer scale.

Because nanometer scale objects are not directly visible to the human eye or most microscopes, it is difficult for any mechanical system to verify ongoing nanometer scale accuracy during operation. In general, a five percent rule-of-thumb for position control as a fraction of the feature dimension is required of the equipment that is used to create nanometer scale features. For example, conventional optical disk products are mastered with a mastering system position control which regulates the track pitch of the master patterns. Older compact disk (CD) formats with a track pitch of 1.6 microns required track pitch control of 50-100 nanometers and digital video disk (DVD) formats with a track pitch of 0.74 microns required track pitch control of approximately 30 nanometers. As track pitches continue to progress to smaller sizes, conventional control systems will become ineffective.

Interferrometric sensors with significant environmental control and interpolation can give resolution on the order of a few nanometers over distances of meters, but interpolations from wavelength to the sub-nanometer range is non-trivial. Reference gratings or rulers can also be used in some positioning systems with interpolation to obtain precision within a few nanometers, e.g., less than 10 nanometers, depending on the quality of ruling engine and maximum ruling distances. Alternatively, commercially available capacitive sensors can give one nanometer position precision or better, but the range of these capacitive sensors is typically limited to approximately 50-100 microns. For this reason, capacitive sensors have limited use in conventional systems which require precise translation over distances larger than 100 microns.

SUMMARY

In general, the invention is directed to a system for precisely determining positions over a relatively large range, with resolution on the order of nanometers or sub-nanometers. In particular, a system is described that utilizes first and second sensor assemblies to determine a position of a movable element, such as the position of mastering optics of an optical data storage disk mastering system. The system facilitates positioning determinations over distances many times the capable range of operation of the individual sensor assemblies.

In accordance with the invention, two sensor assemblies "leap-frog" one another in an incremental fashion to ensure that at least one of the sensor assemblies is always within its operational range. Moreover, a control system may utilize positional signals generated by one of the sensor assemblies to reset or re-calibrate the position of the other sensor assembly, following an adjustment of the other sensor assembly. In particular, when one of the sensor assemblies is out of its range of operation, the out of range sensor assembly is adjusted to a position within its range of operation via an actuator, e.g., a stepper motor. The adjusted sensor assembly is then calibrated with respect to the movable element, based on the positional signals of the other sensor assembly, which should be within range. The two sensor assemblies are alternately adjusted and calibrated in a leapfrog fashion so that the movable element is always tracked by at least one of the sensor assemblies that is within its operational range. The positional signals generated by one or both sensor assemblies can be used to determine a position of the movable element with resolution of the individual sensor assembly. As a result, the invention can determine the position of a movable element according to the resolution of a sensor assembly as the movable element translates over the range of operation of the actuator, which is much larger than the limited range of operation of an individual sensor assembly.

In one embodiment, the invention provides a method comprising receiving first positional signals from a first sensor assembly, the first positional signals being indicative of a first distance between a first sensor element and a second sensor element of the first sensor assembly, wherein the first sensor element is attached to a first sensor arm and the second sensor element is attached to a movable element. The method also comprises receiving second positional signals from a second sensor assembly, the second positional signals being indicative of a second distance between a third sensor element and a fourth sensor element of the second sensor assembly, wherein the third sensor element is attached to a second sensor arm and the fourth sensor element is attached to the movable element. The position of the movable element can then be identified based on at least one of the first and second positional signals. The method may further include adjusting the first and second sensor arms in a leapfrogging fashion to ensure that at least one of the first and second sensor assemblies is always within its respective operational range.

In another embodiment, the invention is directed to a system comprising a first sensor assembly including a first sensor element attached to a first sensor arm, a second sensor element attached to a movable element, and a first actuator that adjusts the first sensor arm, wherein the first sensor assembly generates first positional signals indicative of a first distance between the first and second sensor elements. The system also includes a second sensor assembly including a third sensor element attached to a second sensor arm, a fourth sensor element attached to the movable element, and a second actuator that adjusts the second sensor arm, wherein the second sensor assembly generates second positional signals indicative of a second distance between the third and fourth sensor elements. A sensor assembly controller is coupled to the first and second sensor assemblies. The sensor assembly controller receives the first and second positional signals and identifies the position of the movable element based on at least one of the first and second positional signals.

In another embodiment, the invention provides a system comprising a master disk, mastering optics that provides light to expose the master disk, and an optics controller that controls positioning of the mastering optics and controls on-off switching of light provided by the mastering optics. The system also includes a spindle that spins the master disk and spindle controller that controls the rate at which the spindle spins. In addition, the system includes a first capacitive sensor assembly including a first capacitive sensor element attached to a first sensor arm, a second capacitive sensor element attached to the mastering optics, and a first actuator that adjusts the first sensor arm, wherein the first capacitive sensor assembly generates first positional signals indicative of a first distance between the first and second capacitive sensor elements of the first capacitive sensor assembly. The system further includes a second capacitive sensor assembly including a third capacitive sensor element attached to a second sensor arm, a fourth capacitive sensor element attached to the mastering optics, and a second actuator that adjusts the second sensor arm, wherein the second capacitive sensor assembly generates second positional signals indicative of a second distance between the third and fourth capacitive sensor elements of the second capacitive sensor assembly. A sensor assembly controller is coupled to the first and second capacitive sensor assemblies. The sensor assembly controller receives the first and second positional signals and identifies a position of the mastering optics with respect to the master based on the first and second positional signals.

The invention may be capable of providing a number of advantages. In particular, the invention uses two sensor or more assemblies in complimentary fashion to achieve very accurate positional measurements over a larger range than the range of either of the individual sensor assemblies. The described invention adjusts the position of one of the two sensor assemblies by mechanically resetting a sensor assembly via an actuator and then calibrates the adjusted sensor assembly based on the positional signals generated by the other sensor assembly. The invention contemplates calibrating the two sensor assemblies alternately in a leapfrog fashion so that at least one of the two sensor assemblies is within its respective range of operation of the movable element at all times. As a result, the invention can determine a position of a movable element or work piece according to the resolution of a sensor assembly over the range of operation of the actuator, rather than over the limited operational range of operation of an individual sensor assembly.

The invention may be particularly advantageous with capacitive sensors, which have good resolution but limited range. For example, capacitive sensors are useful because of their ability to give resolution of one nanometer or better, but are conventionally limited to a range of operation of approximately 50-100 microns. By alternately mechanically resetting the two sensor assemblies via an actuator so that at least one of the sensor assemblies is within its respective range of operation at all times, the invention can extend the limited range of capacitive sensors to that of the range of operation of the actuator, which can be many times that of the individual sensor assemblies. The accuracy of the capacitive sensors can be preserved by calibrating an adjusted sensor assembly based on the positional signals generated by the other sensor assembly. The sensor assembly controller can store information that maps the first and second positional signals to the position of the movable element, and this information can be incrementally updated as each assembly is adjusted in the leapfrogging fashion.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
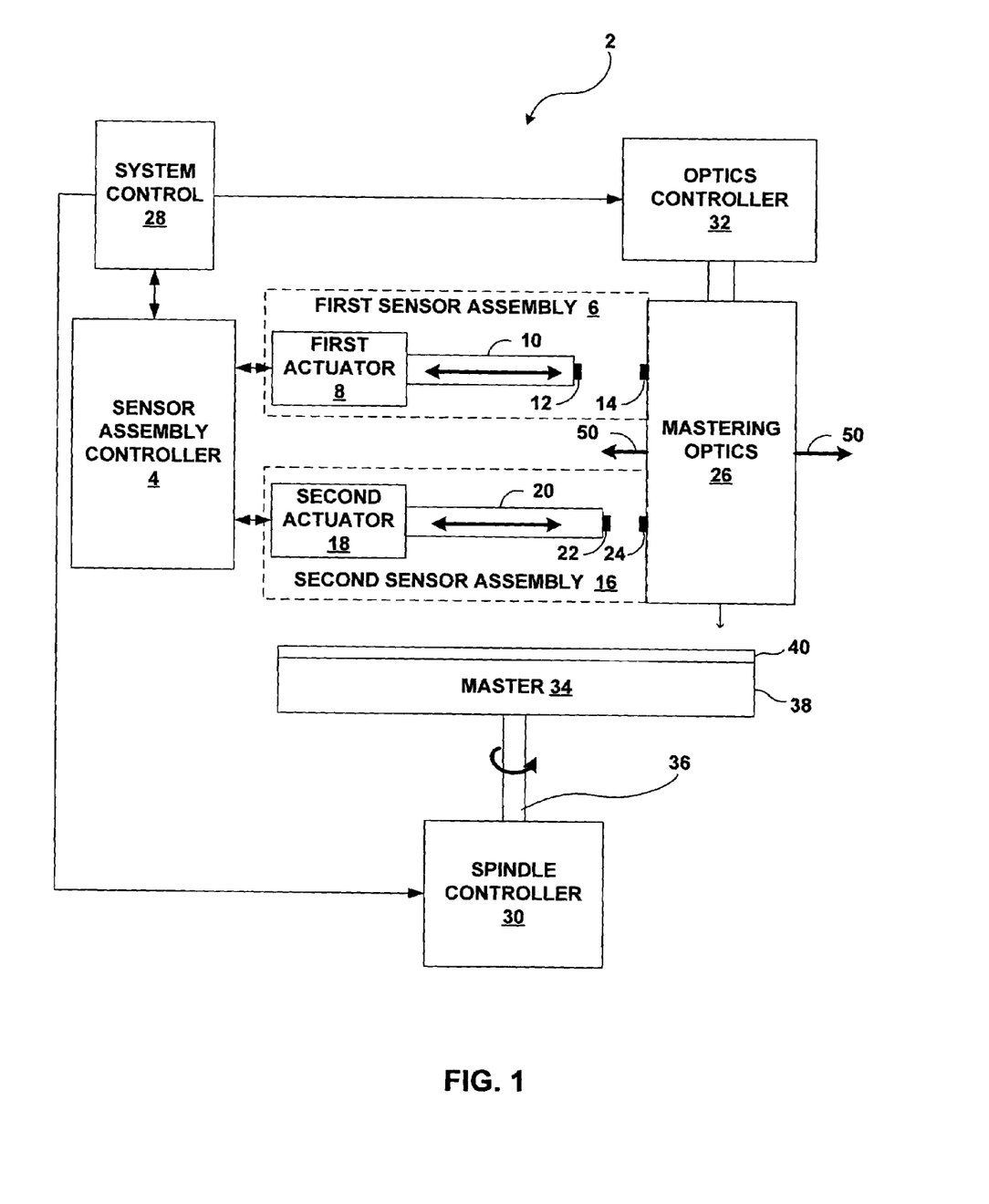
FIG. 1 is a block diagram of an optical disk mastering system making use of a dual sensor assembly system according to an embodiment of the invention.

FIG. 1 is a block diagram illustrating a optical disk mastering system 2 making use of a sensor assemblies 6 and 16 according to an embodiment of the invention. Although the invention is illustrated in the context optical storage disk mastering system 2, the invention may find broad application in many other settings. In other words, an optical disk mastering system 2 is only one of a large number of potential applications for the invention. In general, the invention can be useful in any application where it is desirable to utilize a positional sensor assembly over a range that is larger than that of the sensor assembly. In this case, in accordance with the invention, two different sensor assemblies 6 and 16 are used in a leapfrogging fashion to extend the positional sensing range within system 2, without sacrificing positional accuracy.

Capacitive sensor assemblies are described below as one useful example of a sensor assembly with good accuracy and limited range. The invention, however, could also implement any of a wide variety of sensor assemblies, including interferometric sensor assemblies, piezoelectric sensor assemblies, electroresistive sensor assemblies, or other sensor assemblies. Again, the invention may be useful whenever it is desirable to implement such sensor assemblies over a range that is larger than that of the sensor assembly.

Referring again to exemplary FIG. 1, optical disk mastering system 2 allows for precise determinations of the position of mastering optics 26 with respect to master 34 with resolution on the order of nanometers or sub-nanometers. In order to determine and follow the position of mastering optics 26 with respect to master 34, optical disk mastering system 2 includes a sensor assembly controller 4, a first sensor assembly 6, and a second sensor assembly 16. First sensor assembly 6 includes a first sensor element 12 attached to a first sensor arm 10, a second sensor element 14 attached to mastering optics 26, and a first actuator 8 that adjusts first sensor arm 10. Second sensor assembly 16 includes a third sensor element 22 attached to a second sensor arm 20, a fourth sensor element 24 attached to mastering optics 26, and a second actuator 18 that adjusts second sensor arm 20.

In the illustrated embodiment, first and second sensor elements 12 and 14 may comprise capacitive sensor elements. In other embodiments, however, the invention may implement interferometric sensor elements, piezoelectric sensor elements, electroresistive sensor elements, or other sensor elements having good resolution but limited range. First actuator 8 may comprise a stepper motor. Like first and second sensor elements 12 and 14, third and fourth sensor elements 22 and 24 may comprise capacitive sensor elements, although other types of sensor elements could also be used. Like first actuator 8, second actuator 18 may comprise a stepper motor. Sensor arms 10 and 20 generally refer to a mechanical rod, shaft, pole, pin, or any other element that can carry a sensor element for proper positioning with respect to another sensor element. Actuators 8 and 18 are generally mechanisms for respectively moving sensor arms 10 and 20 to coarsely position sensor elements 12 and 22 with respect to sensor elements 14 and 24.

Although the invention is illustrated as having two sensor elements 12, 14 and 22, 24 for each of the first and second sensor assemblies 6 and 16, respectively, the invention is not limited as such and may include only one sensor element or more than two sensor elements according to the type of sensor being implemented in a sensor assembly. The sensor elements of an interferometric sensor assembly, for example, may include a laser, one or more mirrors and other optics, and a photodetector. As described in greater detail below, optical disk mastering system 2 includes features that can improve the mastering process by facilitating mastering to accuracy on the nanometer scale. Accordingly, optical disk mastering system 2 may be very useful for mastering next generation optical media having track pitches that require accuracy on a nanometer or sub-nanometer scale.

In the illustrated embodiment, optical disk mastering system 2 utilizes first sensor assembly 6 and second sensor assembly 16 to determine the position of mastering optics 26 as mastering optics 26 translate over a distance many times the capable range of operation of the first and second sensor assemblies 6 and 16. Sensor assembly controller 4, for example, may comprise hardware, software, or a combination of hardware and software that provides control over first and second sensor assemblies 6 and 16, respectively. For example, sensor assembly controller 4 may provide control signals to drive actuators 8 and 18, and may receive positional signals based on the distances sensed by sensors 12 and 14 and sensors 22 and 24. Sensor assembly controller 4 can store information that maps the first and second positional signals to the position of the movable element, e.g., mastering optics 26, and this information can be incrementally updated as each assembly is adjusted in the leapfrogging fashion as described herein.

The optical storage disk mastering system 2 may include a system control 28, such as a personal computer, workstation, or other computer system. System control 28, for example, may comprise one or more processors that execute software to provide user control over the optical storage disk mastering system 2. System control 28 provides control signals to spindle controller 30 and optics controller 32 in response to user input and feedback received from sensor assembly controller 4. Sensor assembly controller 4 may store information corresponding to the positional signals and provides feedback to system control 28 based on the first and second positional signals to accurately define the position of mastering optics 26 with respect to data storage disk master 34. Sensor assembly controller 4 stores information as an accurate and on-going record of the motion of mastering optics 26 with respect to data storage disk master 34 (hereafter "master) as mastering optics 26 translate in radial direction 50. Any such motion can be identified by a given one of sensor assemblies 6, 16 that is within range at that given time. The control signals sent from system control 28 to spindle controller 30 define the operation of the optical storage disk mastering system during the mastering process. Controllers 4, 30 and 32 may comprise software routines that operate within system control 28, or may comprise hardware, firmware or any combination of hardware, software and firmware.

Master 34 may comprise a disk-shaped glass substrate 38 coated with a photoresist layer 40. Other substrate materials of suitable optical surface quality may also be used. In any case, master 34 is carefully placed in the optical storage disk mastering system 2 on spindle 36. Mastering optics 26 provide light that exposes photoresist layer 40 according to commands executed by optics controller 32.

Spindle controller 30 causes spindle 36 to spin master 34 while optics controller 32 controls the positioning of mastering optics 26 relative to master 34. Optics controller 32 also controls any on-off switching of light that is emitted from mastering optics 26. As master 34 spins on spindle 36, optics controller 32 translates mastering optics 26 to desired positions and causes mastering optics 26 to emit light that exposes photoresist layer 40. The exposed (or unexposed) photoresist can then be removed via a developer solution to define a master pattern of grooves and lands.

Sensor assemblies 6 and 16 implement two separate sets of sensor elements 12, 14 and 22, 24. Moreover, sensor assemblies 6 and 16 operate in a leapfrogging fashion in order to provide nanometer scale precision over a large range of motion, as described herein. In this manner, sensor assemblies 6 and 16 provide advantages over conventional sensor arrangements used in conventional optical mastering systems. Of course, the invention may find application in a wide variety of other settings, as mentioned above. Second sensor element 14 and third sensor element 24 are attached to a movable element, e.g., in this case mastering optics 26. However, other settings where the invention may be useful include, for example, micro-machining, optical lithographic patterning, electron beam lithographic patterning, ion beam lithographic patterning, magnetic head positioning, and other position control systems. In those cases, the movable element would comprise the work piece being monitored with nanometer-scale precision. In order to illustrate the growing need for improved sensor precision over a large range of motion within optical disk mastering settings, however, conventional optical mastering will now be discussed.

Conventional optical mastering involves the scanning of a focused laser spot to define and record grooves and lands at a precise track pitch. Limitations to mechanical systems, acoustical noise, laser pointing, and water and air flow turbulence are all sources of track pitch variations, which are typically on the order of 10 nanometers for state-of-the-art mastering systems. For tightening track pitch targets, the track pitch variation requirements scale in proportion.

For historical reference, compact-disk (CD) formats, recorded at 1.6 micron track pitch, required track pitch variation to be less than 50-100 nanometers (peak-to-peak). For DVD (digital video disk or digital versatile disk), where track pitch was decreased to 0.74 micron, the track pitch variation tolerance was reduced to approximately 20-30 nanometers (peak-to-peak). For formats at 0.4 micron track pitch, the track pitch variation was required to be approximately 10-15 nanometers (peak-to-peak). As the trend for reduced track pitch continues, track pitch variations may approach limits of conventional mastering controllers and conventional mastering optics. In general, a five percent rule-of-thumb for position control as a fraction of feature dimension is required of the equipment that produces nanometer scale objects. A misalignment tolerance of comparable fraction exists for integrated circuit lithographic patterns as well.

As evidenced at a recent IEEE Nanoscale Devices and System Integration (NDSI) conference, nanotechnology experiments eyeing applications and potential products are challenged with metrology limitations for standards, measurements, and fabrication position control on the nanoscale. Using the five percent rule-of-thumb, dimensional requirements of sub-100 nanometer feature dimensions mandate sub-5 nanometer position control systems and strategies. It is difficult for existing interferrometric and grating based positioning systems to achieve the sub-5 nanometer position control required for sub-100 nanometer feature dimensions. The invention described herein, however, can enable the sub-5 nanometer position control required for sub-100 nanometer feature dimensions in optical mastering.

Interferometric sensors with significant environmental control and interpolation can give resolution on the order of a few nanometers over distances of meters, but interpolations from wavelengths to the sub-nanometer range is non-trivial. Reference gratings or rulers are also used in some positioning systems with interpolation to obtain few nanometer precision, e.g., less than ten nanometers, depending on the quality of the ruling actuator and maximum ruling distances. Alternatively, commercially available capacitive sensors can give one nanometer precision or better, but have an operational range typically limited to the order of 50-100 microns with resolution expressed as a percentage of operational range.

As described in greater detail in FIGS. 2-6, the invention utilizes first and second sensor assemblies 6 and 16 to determine the position of mastering optics 26 as mastering optics 26 translate along radial dimension 50 with respect to master 34, over a distance many times the capable range of operation of first sensor assembly 6 or second sensor assembly 16. Again, sensor elements 12, 14, 22, and 24, respectively, may comprise capacitive sensor elements, although the invention is not necessarily limited in that respect. The range of operation of commercially available capacitive sensor elements is typically limited to the order of 50-100 microns with the resolution of the capacitive sensor element expressed as a percentage of range. Mastering optics 26 may translate along the radial dimension of master 34 which can be a distance of approximately 12 centimeters. Therefore, the described invention is particularly advantageous for determining the position of mastering optics 26 as mastering optics translate along the radial dimension 50 of master 34.

In particular, first and second sensor assemblies 6 and 16 generate first and second positional signals, respectively, which are received by sensor assembly controller 4. The first positional signals are indicative of a distance between first sensor element 12 and second sensor element 14 while the second positional signals are indicative of a distance between third sensor element 22 and fourth sensor element 24.

Sensor assembly controller 4 receives the first and second positional signals as mastering optics 26 translate along radial dimension 50 of master 34. Sensor assembly controller 4 uses these signals to provide positional feedback to system control 28 so that mastering optics 26 can be moved and controlled by optics controller 32 with great precision. As mastering optics 26 translate along radial dimension 50 of master 34, mastering optics 26 can move out of the range of operation of one of first sensor assembly 6 or second sensor assembly 16. If, for example, mastering optics 26 move out of the range of operation of first sensor assembly 6, sensor assembly controller 4 causes first actuator 8 to adjust first sensor arm 10. Sensor assembly controller 4 may determine when first sensor assembly 6 is out of its range of operation based on the first positional signals. First actuator 8 may adjust first sensor arm 10 so that mastering optics 26 are back within the range of operation of first sensor assembly 6 in response to a control signal received from sensor assembly controller 4. Sensor assembly controller 4 re-calibrates first sensor assembly 6 following adjustment of first sensor arm 10 based on the second positional signal. The re-calibration of first sensor assembly 6 may comprise associating the adjusted position of the first sensor assembly 6 with position of mastering optics 26 as determined by the second positional signals generated by second sensor assembly 16. In other words, the positioning identified by second sensor assembly 16, which is within its useful range, is used to re-calibrate first sensor assembly 6 following adjustment by first actuator 8. Thus, when first actuator 8 moves first sensor arm 10 so that first and second sensor elements 12, 14 are within the useful range of operation of first sensor assembly 6, second sensor assembly 16 can provide input used to re-calibrate first sensor assembly 6.

In the same manner, when second sensor assembly 16 exceeds its useful range, it can be adjusted and the positional calculations of first sensor assembly 6 can be used to re-calibrate second sensor assembly 16 following adjustment by second actuator 18. Furthermore, this process can repeat in an iterative leapfrogging fashion such that sensor assemblies 6, 16 leapfrog one another in order to ensure that at least one set of sensor elements 12, 14 or 22, 24 is always within a useful range of operation. Sensor assembly controller 4 may store information corresponding to the first and second positional signals as an accurate and on-going record of the motion of mastering optics 26 with respect to master 34. Any such motion can be identified by a given one of sensor assemblies 6, 16 that is within range at that given time, and when both sensor assemblies 6, 16 are within range, an average of the positional signals may be used to provide additional accuracy. Therefore, sensor assembly controller 4 can provide feedback to system control 28 based on the first and second positional signals to accurately define the position of mastering optics 26 with respect to data storage disk master 34. As a result, optical disk mastering system 2 can give resolution on the order of nanometers or sub-nanometers over distances much greater than the range of an individual sensor assembly. The resolution is generally dependent upon the sensor elements, but the range is dependent on the range of the actuator, rather than the limited range of sensor elements.

It is important to note once again that the invention is not limited to optical storage disk mastering systems, but can be used to determine a position moving over any distance many times the capable operational range of an individual sensor assembly. In other settings, second sensor element 14 and third sensor element 24 are attached to a movable element such as any workpiece being position-monitored. The invention determines the position of the movable element as the movable element translates over a distance many times greater than the range of operation of the an individual sensor assembly. For example, the invention may be advantageous in any system requiring position control on the nanometer or sub-nanometer scale. As specific non-limited examples, the invention may also be implemented in a micro-machining system, optical or e-beam or ion beam lithographic patterning system, magnetic head positioning or other position control systems. Accordingly, the discussion of the invention in the context of optical disk mastering is merely indicative of one exemplary application and is in no way limiting of the invention. In an e-beam lithography setting, the moveable element may comprise a wafer stage that moves with respect to the e-beam field of view (exposure area). The wafer stage may hold a coated silicon wafer as it moves across the e-beam field of view. In that case, for example, the movement of the coated silicon wafer stage would be measured and monitored by the respective sensor assembles in accordance with the invention.

FIGS. 2-6 are block diagrams of portions of optical disk mastering system 2 illustrated in FIG. 1 as mastering optics 26 translate over a number of tracks along radial dimension 50 of master 34 (FIG. 1). In accordance with the invention, iterative adjustments and calibrations are performed in order to maintain mastering optics 26 within the range of operation of at least one of the first and second sensor assemblies 6 and 16 at all times. FIGS. 2-6 specifically illustrate sensor assembly controller 4, first sensor assembly 6, second sensor assembly 16, and mastering optics 26 of optical disk mastering system 2.

Master 34 (FIG. 1) that spins beneath mastering optics 26 is not illustrated in FIGS. 2-6. It is understood, however, that mastering optics 26 translate along radial dimension 50 of master 34 (FIG. 1). First and second sensor assemblies 6 and 16 generate a first and second positional signals, respectively. The first positional signals are indicative of a distance between first sensor element 12 and second sensor element 14 and the second positional signals are indicative of a distance between third sensor element 22 and fourth sensor element 24. Sensor assembly controller 4 receives the first and second positional signals as mastering optics 26 translate along radial dimension 50 of master 34 (FIG. 1). Sensor assembly controller 4 provides positional feedback to system control 28 (FIG. 1) so that mastering optics 26 can be moved with great precision.

Sensor assembly controller 4 store information corresponding to the first and second positional signals as an accurate and on-going record of the motion of mastering optics 26 with respect to master 34 (FIG. 1) as mastering optics 26 translate in radial direction 50. The stored information may comprise mappings between the current positional signals and the current position of mastering optics 26. Any such motion of mastering optics 26 can be identified by changes in the positional signals a given one of sensor assemblies 6, 16 that is within range at that given time. When both sensor assemblies 6, 16 are within range, an average of the positional signals may be used to provide additional accuracy.

As mastering optics 26 translate along radial dimension 50, mastering optics 26 may move out of the range of operation of one of first sensor assembly 6 or second sensor assembly 16. For example, mastering optics 26 may move out of the range of operation of first sensor assembly 6. In that case, sensor assembly controller 4 causes first actuator 8 to adjust the first sensor arm 10. For example, in response to receiving a control signal from sensor assembly controller 4, first actuator 8 adjusts first sensor arm 10 so that mastering optics 26 are back within the range of operation of first sensor assembly 6.

First actuator 8 may comprise a stepper motor. The stepper motor may be a conventional electrical stepper motor capable of stepping N micron sized steps, where N represents a whole positive integer. Although stepper motors typically have excellent holding torque to lock first sensor arm 10 in position following an adjustment, stepper motors are typically coarse precision devices. In other words, the stepper motor acting as first actuator 8 coarsely positions first sensor arm 10. First actuator 8 may adjust first sensor arm 10 according to a pre-defined distance. The pre-defined distance may be defined to be a distance corresponding to N micron steps. Accordingly, first sensor arm 10 can be adjusted according to a pre-defined distance in order to place sensors 12 and 14 back within a useful range.

Following the adjustment of first sensor arm 10, sensor assembly controller 4 calibrates first sensor assembly 6 based on the second positional signals provided by second sensor assembly 16, which should still be within its useful range. In other words, the position of mastering optics 26 identified by second sensor assembly 16, which is within its useful range, is used to calibrate first sensor assembly 6 following adjustment by first actuator 8. In this manner, the positioning of mastering optics 26 with respect to master 34 can be determined over larger distance than could be achieved with individual sensor assemblies. When first actuator 8 moves sensor elements 12, 14 to within useful sensor range of mastering optics 26, second sensor assembly 16 provides the needed input to calibrate first sensor assembly 6 to correspond to an accurate representation of the positioning of mastering optics 26.

In the same manner, when mastering optics 26 move out of the range of operation of second sensor assembly 16, sensor assembly controller 4 causes second actuator 18 to adjust second sensor arm 20 based on the second positional signal. In response to receiving a control signal from sensor assembly controller 4, second actuator 18 adjusts second sensor arm 20 so that mastering optics 26 are back within the range of operation of second sensor assembly 16. Like first actuator 8, second actuator 18 may comprise a stepper motor, although the invention is not necessarily limited in that respect. Consequently, second actuator 18 may adjust second sensor arm 20 according to a pre-defined steps as described previously.

Following the adjustment of second sensor assembly 16, sensor assembly controller 4 calibrates second sensor assembly 16 based on the first positional signals generated by first sensor assembly 6, which should still be within its useful range. Calibrating second sensor assembly 16 comprises associating the adjusted position of second sensor assembly 16 with the location of mastering optics 26, as determined by the first positional signal. In other words, the position identified by first sensor assembly 6, which is within its useful range, is used to calibrate second sensor assembly 16 following adjustment by second actuator 18. Thus, first sensor assembly 6 provides the needed input to calibrate second sensor assembly 16 when second actuator 18 adjusts second sensor arm 10 so that mastering optics 26 are within the useful range of operation of second sensor assembly 16.

Again, sensor assembly controller 4 may maintain an accurate and on-going record of the motion of mastering optics 26 with respect to master 34 (FIG. 1) as mastering optics 26 translate in radial direction 50. Any such motion can be identified by a given one of sensor assemblies 6, 16 that is within range at that given time. In some cases, when both sensor assemblies 6, 16 are within range, an average of the positional signals may be used to provide additional accuracy. The process of adjustments and calibrations of sensor assembles 6, 16 can repeat in an iterative leapfrogging fashion such that sensor assemblies 6, 16 leapfrog one another in order to ensure that at least one set of sensor elements 12, 14 or 22, 24 is always within a useful range of operation. Sensor assembly controller 4 can store information that maps the first and second positional signals to the position of the movable element, and this information can be incrementally updated as each assembly is adjusted in the leapfrogging fashion.

FIGS. 2-6 are block diagrams illustrating portions of optical disk mastering system 2 with respect to mastering optics 26. In order to simplify the description of optical disk mastering system 2 in FIGS. 2-6, it is assumed that sensor assembly controller 4 determines the position of mastering optics 26 based on the positional signals from one active sensor assembly at any given time. In other embodiments, however, both sensor assemblies could be active when both sensor assembles are within range. In that case, an average of the positional signals for both sensor assemblies could be used by sensor assembly controller 4. In the following description of FIGS. 2-6, however, the sensor arm of the currently active sensor assembly is shaded. Furthermore, the illustrated range of operation 52 corresponds to the active sensor assembly illustrated with a shaded sensor arm. Consequently, operational range 52 corresponds to the range of operation of first sensor assembly 6 in FIG. 2. It is also important to note that the range of operation of first sensor assembly 6 is assumed to be equivalent to the range of operation of second sensor assembly 16 in FIGS. 2-6 for illustrative purposes, although the invention is not necessarily limited in that respect.

Figure 2:
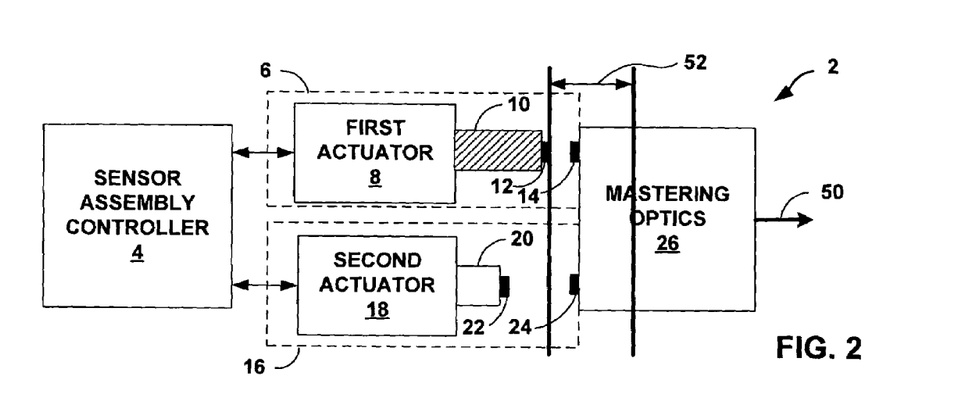
FIGS. 2-6 are block diagrams illustrating portions of the optical disk mastering system illustrated in FIG. 1 as a mastering optic element translates over a distance greater than the range of operation of the individual sensor assemblies.
Figure 3:
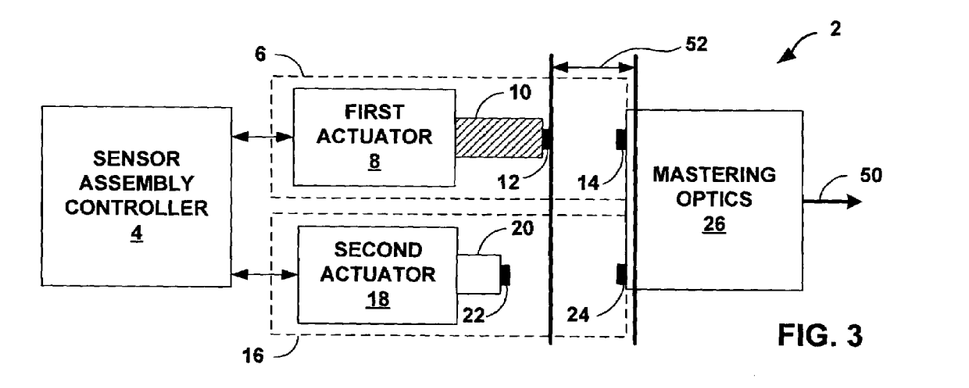

FIG. 3 a block diagram illustrating portions of optical disk mastering system 2 following translation of mastering optics 26 along a radial dimension 50 from its previous position illustrated in FIG. 2. The distance between first sensor element 12 and second sensor element 14 is larger than the distance illustrated in FIG. 2. However, mastering optics 26 remain within the range of operation 52 of first sensor assembly 6. On the other hand, the distance between third sensor element 22 and fourth sensor element 24 is larger than the range of operation of second sensor assembly 16.

Figure 4:
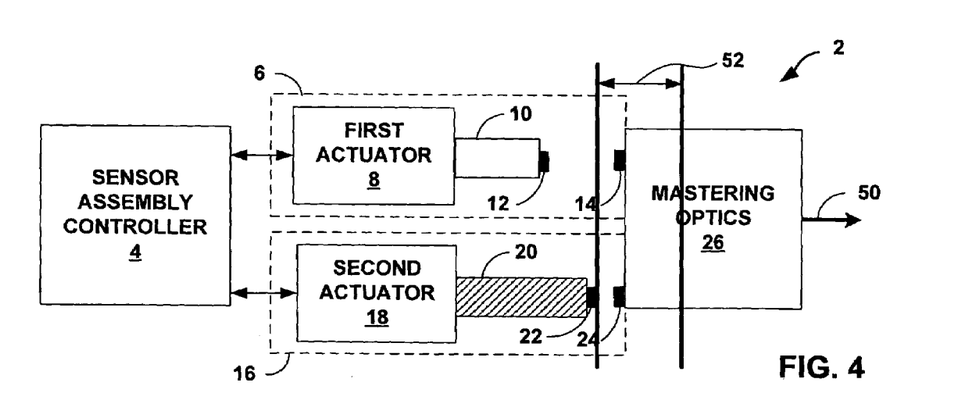

FIG. 4 is a block diagram illustrating portions of optical disk mastering system 2 after sensor assembly controller 4 causes second sensor actuator 18 to adjust second sensor arm 20. Note that for illustrative purposes, mastering optics 26 is in the same position as illustrated in FIG. 3. In FIG. 4, however, sensor assembly controller 4 has caused second sensor arm 20 to adjust before mastering optics 26 is moved out of the range of operation 52 of first sensor assembly 6. In this manner, at least one of sensor assemblies 6, 16 is always within its range of operation. In particular, second actuator 18 physically adjusts second sensor arm 20 in response to a control signal received from sensor assembly controller 4. The control signal may be generated when positional signals indicate that the respective sensor assembly is out of range. As described previously, second actuator 18 may adjust second sensor arm 20 according to a pre-defined distance in order to cause second sensor assembly 16 to be in range.

Following adjustment of second sensor arm 20, sensor assembly controller 4 calibrates second sensor assembly 16 based on the first positional signals generated by first sensor assembly 6, which is still within its useful range. Calibrating second sensor assembly 16 comprises associating the adjusted position of second sensor assembly 16 with the current location of mastering optics 26 as accurately defined, at that point, by the first positional signal. In other words, the position identified by first sensor assembly 6, which is within its useful range, is used to calibrate second sensor assembly 16 following adjustment by second actuator 18. Thus, first sensor assembly 6 provides the input used to calibrate second sensor assembly 16, after second actuator 18 adjusts second sensor arm 10 so that mastering optics 26 are within the useful range of operation of second sensor assembly 16. Again, sensor assembly controller 4 may maintain an accurate and on-going record of the motion of mastering optics 26 with respect to master 34 (FIG. 1) as mastering optics 26 translate in radial direction 50.

Figure 5:
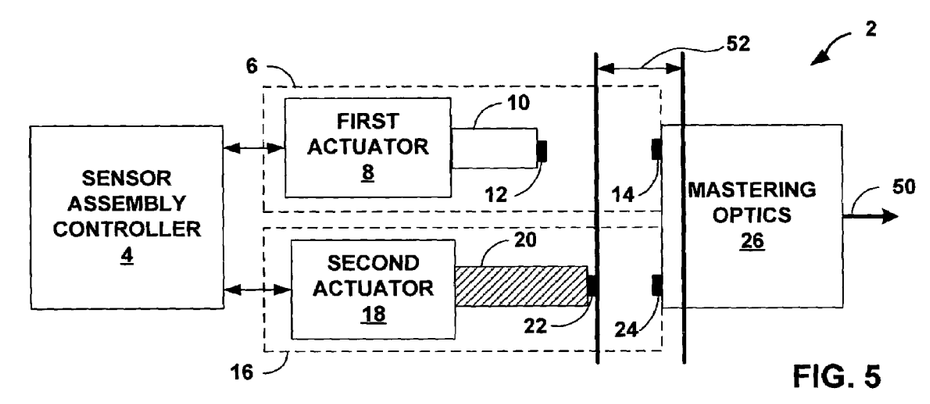

FIG. 5 is a block diagram of optical disk mastering system 2 after mastering optics 26 has further translated along radial dimension 50 of master 34 (FIG. 1) from the position illustrated in FIG. 4. In particular, in FIG. 5 the distance between third sensor element 22 and fourth sensor element 24 is larger than the distance illustrated in FIG. 4. However, mastering optics 26 remain within the range of operation 52 of second sensor assembly 16. On the other hand, the distance between first sensor element 12 and second sensor element 14 is larger than the range of operation of first sensor assembly 6, indicating that an adjustment to first sensor assembly 6 should be made.

Figure 6:
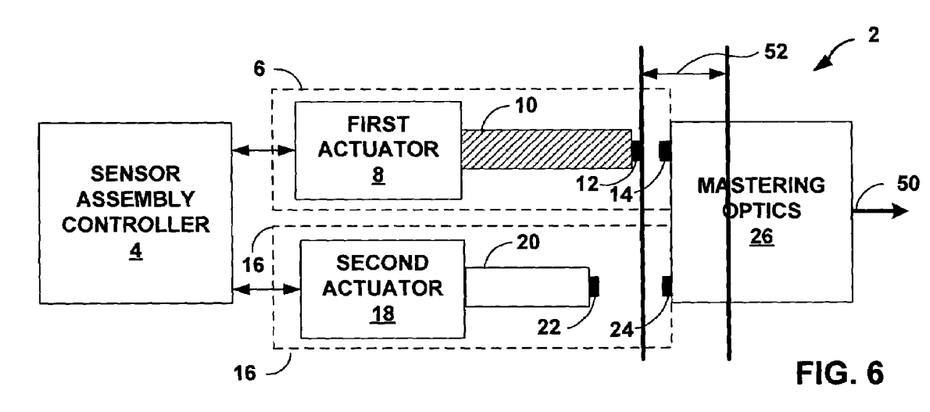

FIG. 6 is a block diagram illustrating portions of optical disk mastering system 2 after sensor assembly controller 4 has caused first actuator 8 to adjust first sensor arm 10. In FIG. 6, mastering optics 26 are in the same position as illustrated in FIG. 5. However, sensor assembly controller 4 caused first actuator 8 to adjust first sensor arm 10. In particular, first actuator 8 physically adjusts first sensor arm 10 in response to a control signal received from sensor assembly controller 4. As described previously, first actuator 8 may adjust first sensor arm 10 according to a pre-defined distance in order to place mastering optics 26 back into the useful range of operation 52 of first sensor assembly 6.

For example, sensor assembly controller 4 may receive the first positional signals indicating that mastering optics 26 is out of the range of operation of first sensor assembly 6, as illustrated in FIG. 5. Sensor assembly controller 4 then sends a command to first actuator 8 to adjust first sensor arm 10. As illustrated in FIG. 6, first sensor assembly 6 is then closer to mastering optics 26 and within range. At that point, sensor assembly controller 4 identifies the position of mastering optics 26 based on the second positional signals of second assembly 16, which is still in range, to recalibrate first assembly 6.

More specifically, following adjustment of first sensor arm 10 to the location illustrated in FIG. 6, sensor assembly controller 4 calibrates first sensor assembly 6 based on the second positional signals generated by second sensor assembly 16, which is still within its useful range. Calibrating first sensor assembly 6 comprises associating the adjusted position of first sensor assembly 6 with the location of mastering optics 26, as currently identified by second positional signal. In other words, the position identified by second sensor assembly 16, which is within its useful range, is used to calibrate first sensor assembly 6 following adjustment by first actuator 8. In this manner, sensor assemblies 6 and 16 leapfrog one another as mastering optics 26 translates along dimension 50 to ensure that one or both of assemblies 6 and 16 are always within range.

Figure 7:
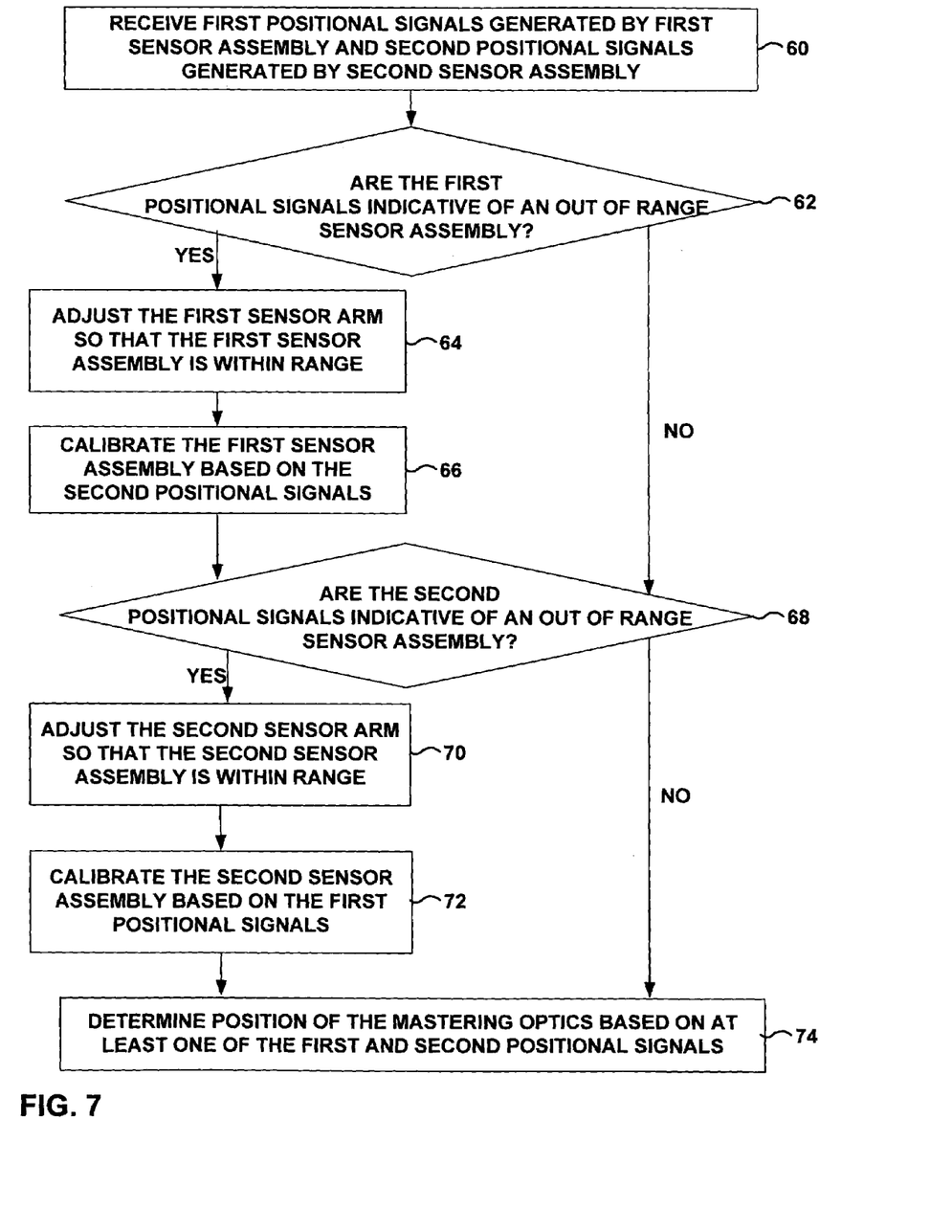
FIG. 7 is a flow diagram illustrating a process for adjusting and calibrating sensor assemblies according to an embodiment of the invention.

FIG. 7 is a flow diagram illustrating a process for calibrating first and second sensor assemblies 6 and 16 and determining the position of mastering optics 26. Generally, sensor assembly controller 4 receives the first and second positional signals generated by first and second sensor assemblies 6 and 16 (60), respectively. Mastering optics 26 translate over radial dimension 50 of master 34 and emit light that exposes photoresist layer 40 in order to define grooves in master 34. The optical storage disk mastering system typically exposes a set of grooves and land on master 34 with each pass across radial dimension 50 of master 34. As mastering optics 26 translate over radial dimension 50 of master 34, the invention maintains mastering optics 26 within the operational range of at least one of first and second sensor assemblies 6 and 16 at all times so that the position of mastering optics can be measured.

If the first positional signals indicate that first sensor assembly 6 is out of range (yes branch of 62), sensor assembly controller 4 causes first actuator 8 to adjust first sensor arm 10 so that mastering optics 26 are within the useful range of operation of first sensor assembly 6 (64). In particular, first actuator 8 adjusts first sensor arm 10 in response to receiving a control signal from sensor assembly controller 4. First actuator 8 may adjust second sensor assembly 16 according to a relatively coarse pre-defined distance, which will ensure that sensor assembly 16 comes back into range. Following the adjustment of first sensor arm 10, the sensor assembly controller 4 calibrates first sensor assembly 6 based on the second positional signals (66). Again, calibrating first sensor assembly 6 may comprise associating the adjusted position of first sensor arm 10 with the current location of mastering optics 26, as currently defined by the second positional signals of second sensor assembly 16.

Similarly, if the second positional signals are indicative of a distance larger than the operational range of second sensor assembly 16 (68), sensor assembly controller 4 causes second actuator 18 to adjust second sensor arm 20 so that second sensor assembly 16 is back into its useful operational range (70). In particular, second actuator 18 adjusts second sensor arm 20 in response to receiving a command from sensor assembly controller 4. In some embodiments, sensor assembly controller 4 may adjust second sensor arm 20 according to a pre-defined distance that generally ensures that second sensor assembly 16 will be within its operational range. Following the adjustment of second sensor arm 20, sensor assembly controller 4 calibrates second sensor assembly 16 based on the first positional signals (72).

In particular, as described herein, calibrating second sensor assembly 16 comprises associating the adjusted position of second sensor assembly 16 with the current location of mastering optics 26 as currently defined by the first positional signals of first sensor assembly 6. Sensor assembly controller 4 may maintain an ongoing mapping of the position of mastering optics 26. Accordingly, sensor assembly controller 4 can determine the position of mastering optics 26 based on at least one of the first and second positional signals (74). For example, sensor assembly controller 4 can identify and measure any movement of mastering optics 26 based on the received positional signals, and can record any coarse "leap-frog" adjustments to provide an ongoing and accurate mapping of the location of mastering optics 26, even as mastering optics 26 translates over a distance greater than the individual resolution of one of assemblies 6, 16.

Various embodiments of the invention have been described. For example, optical disk mastering system 2 has been described for precisely determining a position over a relatively large range, with resolution on the order of nanometers or sub-nanometers. In particular, optical disk mastering system 2 is described for determining the position of mastering optics 26 of an optical storage disk mastering system. However, the invention may find broad application in many other settings including but not limited to micro-machining systems, optical or e-beam or ion beam lithographic patterning systems, magnetic head positioning or other position control systems.

Moreover, the invention could also implement any of a wide variety of sensor assemblies, including interferometric sensor assemblies, piezoelectric sensor assemblies, electroresistive sensor assemblies, or other sensor assemblies, whenever it is desirable to implement such sensor assemblies over a range that is larger than that of the sensor assembly. In other words, although the invention has been primarily described for use with capacitive sensor elements, other types of sensor elements could alternatively be used in a leapfrogging manner as described herein. In some cases, three or more sensor assembles (rather than two) could be used in the leapfrogging fashion, and in that case it may be desirable to ensure that at least two sensor assembles are within range at all times. These and other embodiments are within the scope of the following claims.

The invention claimed is:

1. A system comprising:
a first sensor assembly including a first sensor element attached to a first sensor arm, a second sensor element attached to a movable element, and a first actuator that adjusts the first sensor arm, wherein the first sensor assembly generates first positional signals indicative of a first distance between the first and second sensor elements;
a second sensor assembly including a third sensor element attached to a second sensor arm, a fourth sensor element attached to the movable element, and a second actuator that adjusts the second sensor arm, wherein the second sensor assembly generates second positional signals indicative of a second distance between the third and fourth sensor elements; and
a sensor assembly controller coupled to the first and second sensor assemblies that receives the first and second positional signals and identifies a position of the movable element based on at least one of the first and second positional signals,
wherein the sensor assembly controller causes the first and second sensor arms to adjust in a leapfrogging fashion to ensure that at least one of the first and second sensor assemblies is always within its respective operational range as the movable element moves,
wherein the sensor assembly controller causes the first actuator to adjust the first sensor arm when the first positional signals indicate that the first sensor assembly is out of range, and re-calibrates the first sensor assembly following adjustment of the first sensor arm based on the position of the movable element as determined by the second positional signals, and
wherein the sensor assembly controller associates the first distance following adjustment of the first sensor arm with the position of the movable element as determined by the second distance to re-calibrate the first sensor assembly.

2. A system comprising:
a first sensor assembly including a first sensor element attached to a first sensor arm, a second sensor element attached to a movable element, and a first actuator that adjusts the first sensor arm, wherein the first sensor assembly generates first positional signals indicative of a first distance between the first and second sensor elements;
a second sensor assembly including a third sensor element attached to a second sensor arm, a fourth sensor element attached to the movable element, and a second actuator that adjusts the second sensor arm, wherein the second sensor assembly generates second positional signals indicative of a second distance between the third and fourth sensor elements; and
a sensor assembly controller coupled to the first and second sensor assemblies that receives the first and second positional signals and identifies a position of the movable element based on at least one of the first and second positional signals,
wherein the first, the second, the third, and the fourth sensor elements comprise capacitive sensor elements, and wherein the first actuator and the second actuator comprise stepper motors.

3. The system of claim 1, wherein the sensor assembly controller causes the second actuator to adjust the second sensor arm when the second positional signals indicate that the second sensor assembly is out of range and re-calibrates the second sensor assembly following adjustment of the second sensor arm based on the position of the movable element as determined by the first positional signals.

4. The system of claim 3, wherein sensor assembly controller re-calibrates the second sensor assembly by associating the second distance following adjustment of the second sensor arm with the position of the movable element as determined by the first distance.

5. The system of claim 1, wherein the sensor assembly controller stores information indicative of the position of the movable element based on the first and second positional signals.

6. The system of claim 1, wherein the system comprises an optical mastering system and the movable element comprises mastering optics that provides light to expose a master, the optical mastering system further comprising:
   an optics controller that controls positioning of the mastering optics and controls on-off switching of light provided by the mastering optics;
   a spindle that spins the master;
   a spindle controller that controls a rate at which the spindle spins; and
   a system control that controls the optics controller and the spindle controller in response to user input and positioning feedback received from the sensor assembly controller.

7. The system of claim 6, wherein the sensor assembly controller determines the position of the mastering optics relative to the master based on the first and second positional signals.

8. A system comprising:
   a first senor assembly including a first sensor element attached to a first sensor arm, a second sensor element attached to a movable element, and a first actuator that adjusts the first sensor arm, wherein the first sensor assembly generates first positional signals indicative of a first distance between the first and second sensor elements;
   a second sensor assembly including a third sensor element attached to a second sensor arm, a fourth sensor element attached to the movable element, and a second actuator that adjusts the second sensor arm, wherein the second sensor assembly generates second positional signals indicative of a second distance between the third and fourth sensor elements; and
   a sensor assembly controller coupled to the first and second sensor assemblies that receives the first and second positional signals and identifies a position of the movable element based on at least one of the first and second positional signals,
   wherein the system comprises a lithography system and the movable element comprises a wafer stage.

9. A system comprising:
   a master disk;
   mastering optics that provides light to expose the master disk;
   an optics controller that controls positioning of the mastering optics and controls on-off switching of light provided by the mastering optics;
   a spindle that spins the master disk;
   a spindle controller that controls the rate at which the spindle spins;
   a first capacitive sensor assembly including a first capacitive sensor element attached to a first sensor arm, a second capacitive sensor element attached to the mastering optics, and a first actuator that adjusts the first sensor arm, wherein the first capacitive sensor assembly generates first positional signals indicative of a first distance between the first and second capacitive sensor elements of the first capacitive sensor assembly;
   a second capacitive sensor assembly including a third capacitive sensor element attached to a second sensor arm, a fourth capacitive sensor element attached to the mastering optics, and a second actuator that adjusts the second sensor arm, wherein the second capacitive sensor assembly generates second positional signals indicative of a second distance between the third and fourth capacitive sensor elements of the second capacitive sensor assembly;
   a sensor assembly controller coupled to the first and second capacitive sensor assemblies that receives the first and second positional signals and identifies a position of the mastering optics with respect to the master based on the first and second positional signals.

10. The system of claim 9, wherein the sensor assembly controller causes the first actuator to adjust the first sensor arm when the first positional signals indicate that the first sensor assembly is out of range, and re-calibrates the first sensor assembly based on the second positional signals following adjustment of the first sensor arm.

11. The system of claim 10, wherein the sensor assembly controller re-calibrates the first sensor assembly by associating the first distance following adjustment of the first sensor arm with the position of the mastering optics relative to the master disk as determined by the second distance.

12. The system of claim 9, wherein the sensor assembly controller stores information indicative of position of the mastering optics relative to the master disk based on the first and second positional signals.

* * * * *